S. PENNOCK.

CARPET-STRETCHER.

No. 7,071. Reissued April 18, 1876.

Witnesses.

N. H. Sherburne,

Julius Wilcke

Inventor:

Samuel Pennock

By Gridley & Sherburne

Attys

H. PETERS, PHOTO-LITHOGRAPHER, WASHINGTON, D. C.

UNITED STATES PATENT OFFICE

SAMUEL PENNOCK, OF GENEVA, ILLINOIS, ASSIGNOR TO HIRAM DRULINER, OF LA PORTE, INDIANA; SAID DRULINER ASSIGNOR TO ROYAL MORRIS, OF CHICAGO, ILLINOIS.

IMPROVEMENT IN CARPET-STRETCHERS.

Specification forming part of Letters Patent No. 85,690, dated January 5, 1869; reissue No. 7,071, dated April 18, 1876; application filed March 16, 1876.

*To all whom it may concern:*

Be it known that I, SAMUEL PENNOCK, of Geneva, in the county of Kane and State of Illinois, have invented new and useful Improvements in Carpet-Stretchers; and I do hereby declare the following to be a full, clear, and exact description thereof, which will enable others skilled in the art to which my invention appertains to make and use the same, reference being had to the accompanying drawing, forming part of this specification, in which—

Figure 1:
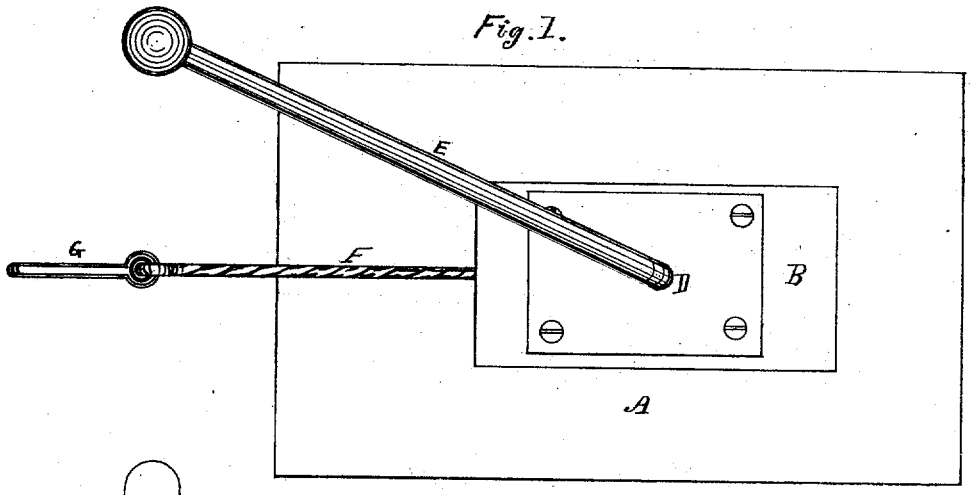
Figure 2:
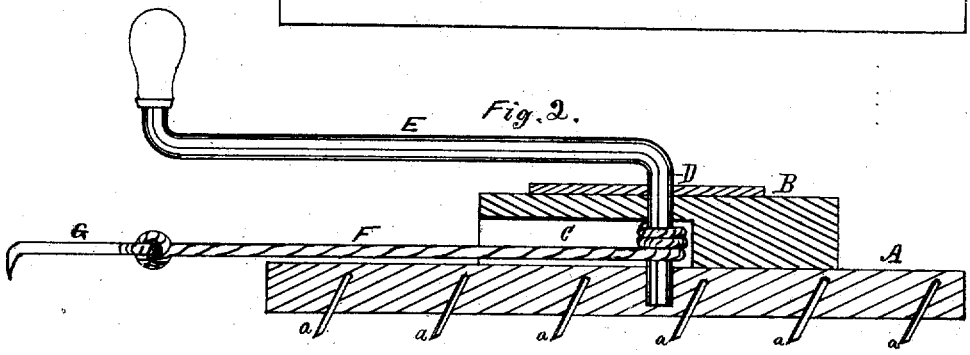

Figure 1 represents a general plan or top view of a carpet-stretcher embodying my invention, and Fig. 2 represents a central longitudinal section of the same.

Like letters of reference indicate like parts.

The object of my invention is to provide a carpet-stretcher with its parts so arranged as to enable the operator to easily and perfectly stretch the carpet after one of the edges of the carpet has been tacked to the floor; and my invention consists in the employment of a base, provided with teeth adapted to take into the carpet, and a windlass, to which is attached an adjusting-cord, provided with a hook adapted to be secured to the floor, so that when the several parts are properly adjusted, the carpet will be stretched by the rotation of the windlass.

In the drawing, A represents the base, which may be made of wood or metal, and of any convenient size. The lower surface of this base is provided with a series of metallic teeth, *a*, which are adapted to take into the carpet, and so as to prevent the base A from being drawn forward independent of the carpet. B is a wood block or plate, permanently attached to and forming part of base A, and is provided with an opening or channel, C, sufficiently large to admit of the cord passing freely through the same, and to allow the cord to pass around the windlass. D is the windlass, which is journaled at one end to the base A, and its other end to the block or plate B of the base A, and so as to freely revolve. E is the crank for imparting motion to the windlass. F is the adjusting-cord, which is secured at one end to the windlass, and to its other end is securely attached a hook, G, of proper shape to admit of being driven into the floor or base-board, or otherwise rigidly secured thereto.

My said carpet-stretcher is applied to use as follows: After one edge of the carpet has been tacked to the floor, the hook is secured to the base-board or to the floor adjacent to the base-board on the side of the room opposite to the edge of the carpet previously tacked to the floor, and the base A placed upon the loose part of the carpet so as to allow the teeth *a* to engage or take into the carpet, when force is applied to the crank, imparting a rotary movement to the windlass, and thereby winding the cord around the windlass until the carpet is stretched as desired, when it is permanently tacked to the floor by the operator of the stretcher or an assistant while under the strain of the cord.

Having thus described my invention, what I claim as new, and desire to secure by Letters Patent, is—

In combination with the base A, provided with the teeth *a*, adapted to take into the carpet, the windlass D, cord F, and hook G, substantially as and for the purpose specified.

SAMUEL PENNOCK.

Witnesses:

J. K. EDDOWES,
J. C. SHERWIN.